United States Patent
Zotto

(10) Patent No.: US 11,663,750 B2
(45) Date of Patent: May 30, 2023

(54) IMAGE DATA BARS

(71) Applicant: Hewlett-Packard Development Company, L.P., Spring, TX (US)

(72) Inventor: Rafael Dal Zotto, Porto Alegre (BR)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/358,413

(22) Filed: Jun. 25, 2021

(65) Prior Publication Data
US 2022/0414943 A1 Dec. 29, 2022

(51) Int. Cl.
G06F 3/0482 (2013.01)
G06T 11/00 (2006.01)
G06F 16/20 (2019.01)
G06T 3/40 (2006.01)
H04L 65/403 (2022.01)
H04N 5/272 (2006.01)

(52) U.S. Cl.
CPC ............ *G06T 11/00* (2013.01); *G06F 3/0482* (2013.01); *G06F 16/20* (2019.01); *G06T 3/40* (2013.01); *H04L 65/403* (2013.01); *H04N 5/272* (2013.01); *G06T 2200/24* (2013.01)

(58) Field of Classification Search
CPC ...................................................... G06T 11/00
USPC ............................................................ 715/753
See application file for complete search history.

(56) References Cited

U.S. PATENT DOCUMENTS

| | | | |
|---|---|---|---|
| 5,627,978 A * | 5/1997 | Altom .................. | H04M 3/567 715/788 |
| 6,629,129 B1 * | 9/2003 | Bookspan ............. | G06Q 10/10 709/204 |
| 8,558,864 B1 * | 10/2013 | Koller .................. | H04N 7/155 455/416 |
| 9,282,287 B1 * | 3/2016 | Marsh .................. | H04N 7/152 |
| 9,538,130 B1 * | 1/2017 | Ford ..................... | H04N 7/15 |
| 9,798,933 B1 * | 10/2017 | Meisser ............... | H04N 23/90 |
| 9,961,302 B1 * | 5/2018 | Henderson ........... | H04N 7/152 |
| 10,798,341 B1 * | 10/2020 | Hegde ................. | H04N 21/8549 |
| 2009/0033737 A1 * | 2/2009 | Goose .................. | H04N 7/15 348/E7.083 |
| 2011/0090301 A1 * | 4/2011 | Aaron .................. | H04N 7/15 348/E7.083 |
| 2012/0262532 A1 * | 10/2012 | Poon .................... | H04N 7/15 348/14.02 |
| 2013/0198635 A1 * | 8/2013 | Jones ................... | G06F 3/0486 715/727 |
| 2013/0198657 A1 * | 8/2013 | Jones ................... | H04L 12/1827 715/753 |
| 2013/0242031 A1 * | 9/2013 | Petterson ............. | H04N 7/157 348/14.07 |
| 2014/0184728 A1 * | 7/2014 | Kwon ................... | H04L 12/1827 348/14.08 |

(Continued)

*Primary Examiner* — Reza Nabi
(74) *Attorney, Agent, or Firm* — Quarles & Brady LLP

(57) ABSTRACT

In some examples, the disclosure describes a device, comprising: a processor resource; and a non-transitory memory resource storing machine-readable instructions stored thereon that, when executed, cause the processor resource to: intercept image data captured at a computing device, determine information associated with the computing device, generate a data bar that includes the determined information, and overlay the data bar on the image data.

15 Claims, 4 Drawing Sheets

(56) References Cited

U.S. PATENT DOCUMENTS

| | | | | |
|---|---|---|---|---|
| 2015/0002610 | A1* | 1/2015 | Hansen | H04N 7/15 348/14.07 |
| 2015/0215351 | A1* | 7/2015 | Barzuza | H04N 7/157 715/757 |
| 2016/0173821 | A1* | 6/2016 | De Magalhaes | H04N 23/611 348/14.08 |
| 2016/0227165 | A1* | 8/2016 | Moorjani | G06F 16/7867 |
| 2016/0373691 | A1* | 12/2016 | Diao | H04L 12/1822 |
| 2017/0026384 | A1* | 1/2017 | Tekwani | G06F 21/31 |
| 2017/0332044 | A1* | 11/2017 | Marlow | G06V 20/46 |
| 2021/0026517 | A1* | 1/2021 | Yang | G06F 3/04817 |
| 2021/0176429 | A1* | 6/2021 | Peters | G06V 20/41 |
| 2021/0232474 | A1* | 7/2021 | Zotto | G06F 11/3075 |
| 2021/0319798 | A1* | 10/2021 | Dal Zotto | G06F 21/32 |
| 2021/0392295 | A1* | 12/2021 | Gronau | G06T 17/20 |
| 2022/0014571 | A1* | 1/2022 | Polish | G06N 20/00 |
| 2022/0058106 | A1* | 2/2022 | Zotto | G06F 11/0754 |

* cited by examiner

IMAGE DATA BARS

BACKGROUND

An electronic device can include a computing device that can perform computing functions. In some examples, the computing device can be coupled to an imaging device, such as a camera. The camera can be utilized to capture images of objects and the computing device can be utilized to store and/or display the images captured by the imaging device.

DETAILED DESCRIPTION

Figure 1:
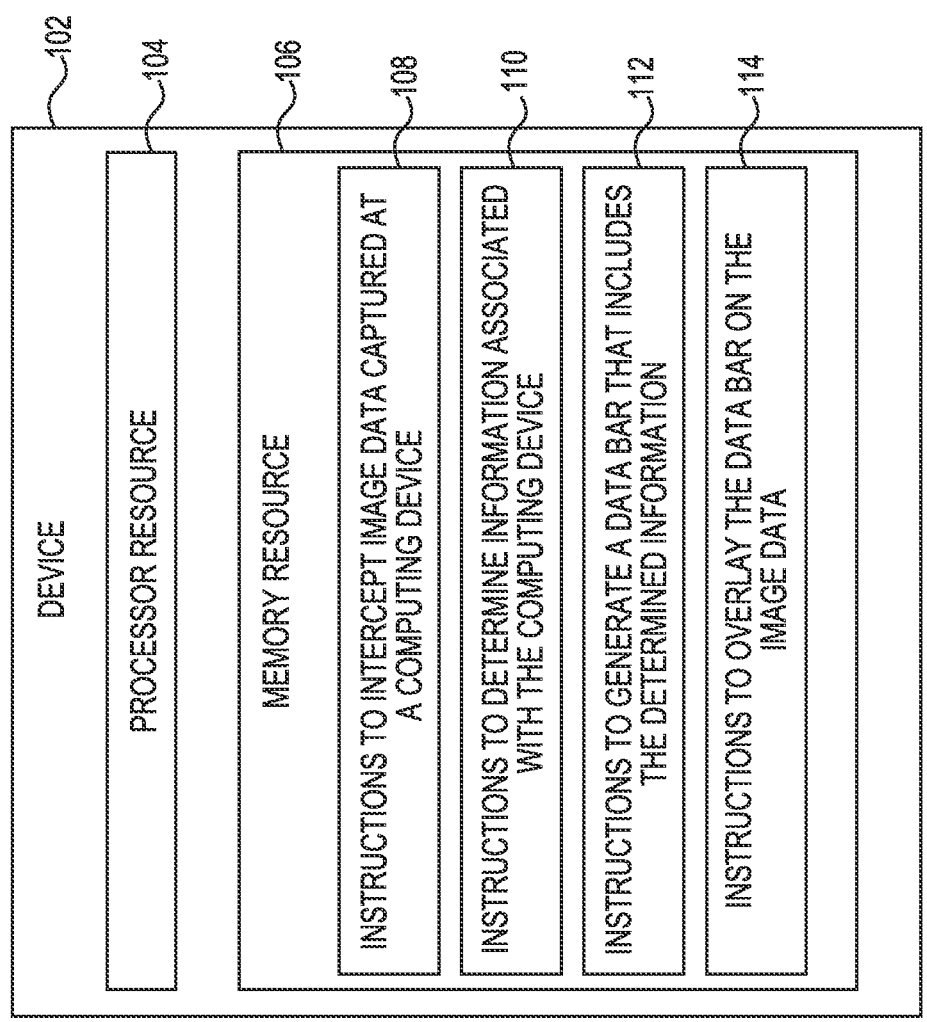
FIG. 1 illustrates an example of a device for providing image data bars.

A user may utilize a computing device for various purposes, such as for business and/or recreational use. As used herein, the term computing device refers to an electronic system having a processor resource and a memory resource. Examples of computing devices can include, for instance, a laptop computer, a notebook computer, a desktop computer, controller, and/or a mobile device (e.g., a smart phone, tablet, personal digital assistant, etc.), among other types of computing devices.

In some examples, computing devices can be utilized as teleconference devices. As used herein, a teleconference device can be utilized to provide audio and/or video data to remote computing devices. In this way, a teleconference device can be a computing device that can communicate with remote computing devices and allow remote users to communicate through audio and/or video data transferred between the plurality of computing devices. In some examples, a plurality of computing devices can be utilized for a teleconference by connecting to a teleconference application. In some examples, the teleconference application can include instructions that can be utilized to receive audio and/or video data from the plurality of computing devices and provide the audio and/or video data to each of the plurality of computing devices. In some examples, the teleconference application can be a teleconference portal that can be utilized by a plurality of computing devices to exchange audio and/or video data. As used herein, a teleconference portal can refer to a gateway for a website that can provide teleconferencing functions.

In some examples, the audio and/or video data can allow users associated with the plurality of computing devices to communicate. In some examples, the plurality of users may be remote users utilizing the teleconference application to discuss a variety of topics. In some examples, the plurality of users may not be familiar with the other users of the teleconference application. In some examples, it can be time consuming to exchange information and/or make introductions when a plurality of users are utilizing the teleconference application.

The present disclosure relates to image data bars that can be displayed along with image data provided by the teleconference application. In some examples, the image data bars can be generated utilizing user data and/or location data associated with a computing device that is capturing the audio and/or image data. In this way, the image data bars can be displayed to provide information to the plurality of users utilizing the teleconference application. In some examples, the image data bars can be generated and overlaid on corresponding image data associated with the plurality of users utilizing the teleconference application. In some examples, the image data bars can be customized to include particular categories of data associated with the user, computing device of the user, and/or geographic location of the user. In this way, the image data bars can be altered based on a type of teleconference a user is attending.

FIG. 1 illustrates an example of a device 102 for providing image data bars. In some examples, the device 102 can include a processor resource 104 communicatively coupled to a memory resource 106. As described further herein, the memory resource 106 can include instructions 108, 110, 112, 114 that can be executed by the processor resource 104 to perform particular functions. In some examples, the device 102 can be utilized to interact with a plurality of remote computing devices and/or remote teleconference devices. In some examples, the device 102 can be coupled to a microphone, image device (e.g., camera, video camera, etc.), and/or display device (e.g., monitor, etc.). In these examples, the device 102 can capture image data utilizing the image device, capture audio data utilizing the microphone, and/or display images captured by remote devices utilizing the display device.

The device 102 can be a computing device that can include components such as a processor resource 104. As used herein, the processor resource 104 can include, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 108, 110, 112, 114. In other examples, the device 102 can include instructions 108, 110, 112, 114, stored on a machine-readable medium (e.g., memory resource 106, non-transitory computer-readable medium, etc.) and executable by a processor resource 104. In a specific example, the device 102 utilizes a non-transitory computer-readable medium storing instructions 108, 110, 112, 114, that, when executed, cause the processor resource 104 to perform corresponding functions.

In some examples, the device 102 can include instructions 108 to intercept image data captured at a computing device. In some examples, the device 102 can be utilized to intercept image data and/or audio data captured by a remote computing device. In these examples, the device 102 can intercept data to be provided to a teleconference application and/or teleconference portal. In some examples, the device 102 can be utilized to modify the image data from the computing device prior to the image data being provided to the teleconference application and/or teleconference portal.

In some examples, the device 102 can utilize a driver device transform to intercept image data captured by an imaging device associated with a computing device. In some examples, the driver device transform can intercept the image data and alter the image data to include additional elements such as an image data bar. In other examples, a proxy camera or virtual camera can be utilized to intercept the image data and alter the image data to include the additional elements. In some examples, the image data bar can be overlaid on the image data at a selected location and the drive device transform can transmit the image data with the image data bar to a teleconference application or teleconference portal. That is, in some examples, the device 102 can include instructions to send the image data with the data bar to a teleconference application to be displayed by a different computing device.

In some examples, the device 102 can include instructions 110 to determine information associated with the computing device. In some examples, the device 102 can extract information from the computing device that has provided the image data. In some examples, the information associated with the device 102 is based on a determined geographic location of the device 102 and a user profile associated with the device 102. For example, the information associated with a computing device can include information related to a geographic location of the computing device such as facts about the geographic location. For example, the information can include a weather report, news stories, upcoming events, and/or other information that can provide information related to the geographic location of the computing device.

In other examples, the information associated with the computing device can include user information associated with the user of the computing device. For example, the information can be personal information related to the user. In some examples, the information can be related to professional information related to the user. In these examples, the information can be input by the user and/or extracted from a profile associated with the user (e.g., social media profile, etc.). For example, the professional information can include a title of the user associated with a particular organization, a working site of the user, and/or other types of work related information (e.g., awards of the user, patents of the user, etc.). In some examples, the information associated with the computing device can be extracted based on a plurality of selected categories. In these examples, the categories can be descriptions of the personal and/or professional information to be extracted. That is, the categories can be information to be shown that can be extracted from external databases and/or third party databases.

In some examples, the device 102 can include instructions 112 to generate a data bar that includes the determined information. In some examples, the data bar can include a plurality of different information that can be displayed within an image portion associated with the computing device. For example, the image data captured by the computing device can be provided to a particular portion of the displayed data. In this example, the image data captured by the computing device can be displayed on a remote computing device communicatively coupled to the teleconference application and/or in the teleconference session. In these examples, the captured image data can be displayed within a particular area of the remote computing device display and the image bar can be sized based on the particular area of the displayed image data.

In some examples, the instructions to generate the data bar can include instructions to generate a selectable link or selectable data that can be downloaded to a remote computing device. For example, the selectable link can be displayed within the image data bar such that a remote user can select the selectable link to receive additional data or information provided by the user of the computing device. In some examples, the user can upload the additional data to the teleconference application and/or teleconference portal. In these examples, the plurality of remote users utilizing the teleconference application can access the additional data by selecting the selectable link that is within the image data bar.

In some examples, the device 102 can include instructions 114 to overlay the data bar on the image data. As described herein, the data bar can include a plurality of categories that include information associated with the plurality of categories for the computing device. In some examples, the information associated with the plurality of categories can be based on performance or health data associated with the computing device capturing the image. In this way, a user can provide real time data regarding the performance or health of the computing device to a different user of the teleconference (e.g., technician, IT support, etc.). In some examples, the information can be displayed within the data bar and overlayed on the image data such that a portion of the image is covered by the data bar. In some examples, the data bar can include a plurality of categories that extend from a first edge to a second edge of the displayed image portion. In some examples, the data bar can be displayed over a portion of the image portion associated with the computing device to provide information to other users of the teleconference. In this way, the image bar can be utilized to provide additional information related to the user, physical location of the computing device, health of the computing device, and/or current events associated with the user and/or physical location.

In some examples, the device 102 can alter determined information at a plurality of time increments. As described further herein, the information within the data bar can be dynamic information that is updated or altered at the plurality of time increments (e.g., every 30 seconds, every minute, etc.). In this way, the information associated with each category or portion of the data bar can be updated dynamically during the teleconference between the plurality of computing devices.

Figure 2:
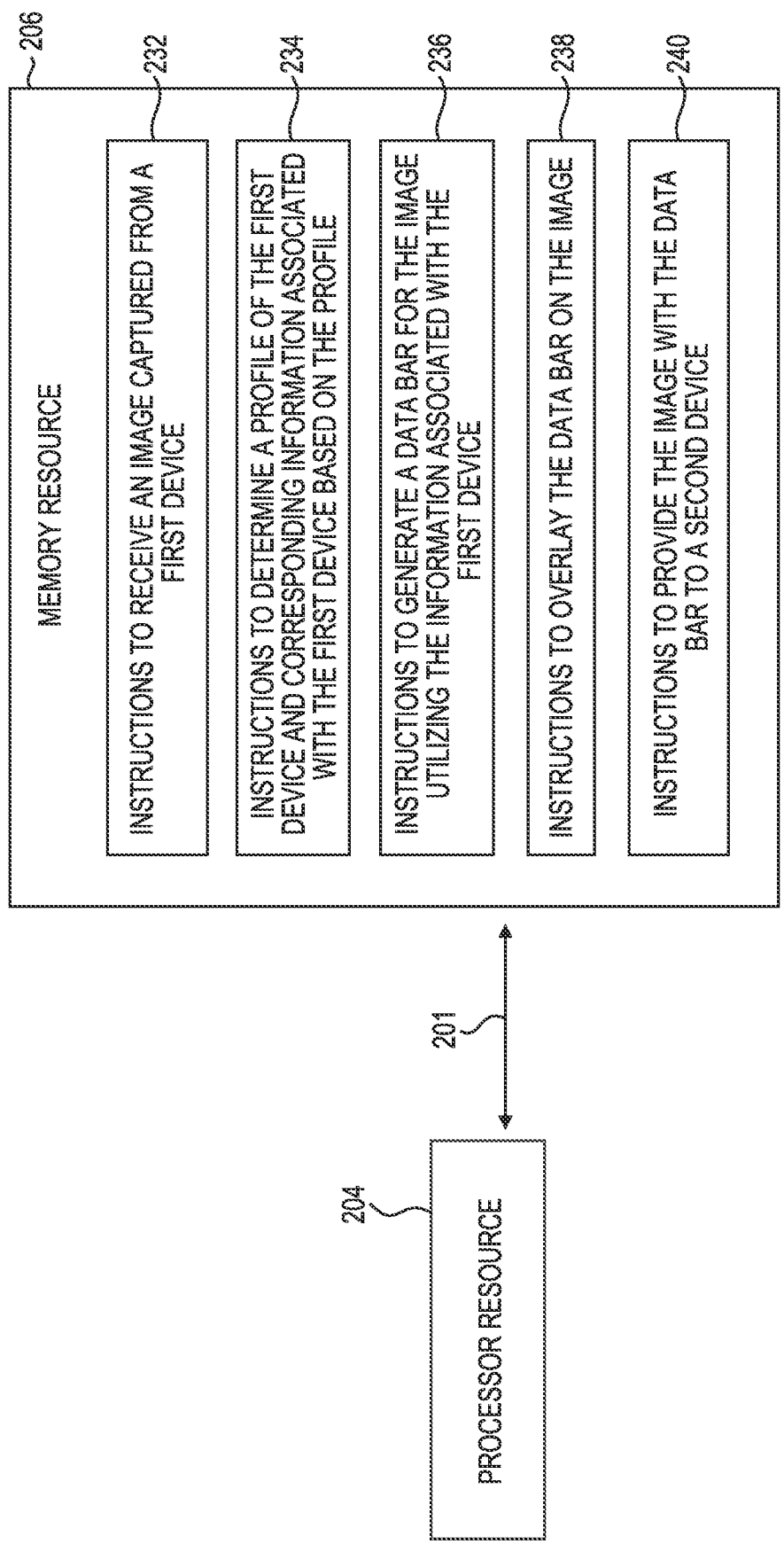
FIG. 2 illustrates an example of a memory resource for providing image data bars.

FIG. 2 illustrates an example of a memory resource 206 for providing image data bars. In some examples, the memory resource 206 can be a part of a computing device or controller that can be communicatively coupled to a system. For example, the memory resource 206 can be part of a device 102 as referenced in FIG. 1. In some examples, the memory resource 206 can be communicatively coupled to a processor resource 204 that can execute instructions 232, 234, 236, 238, 240 stored on the memory resource 206. For example, the memory resource 206 can be communicatively coupled to the processor resource 204 through a communication path 201. In some examples, a communication path 201 can include a wired or wireless connection that can allow communication between devices and/or components within a device or system.

The memory resource 206 may be electronic, magnetic, optical, or other physical storage device that stores executable instructions. Thus, a non-transitory machine readable medium (MRM) (e.g., a memory resource 206) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine readable medium (e.g., a memory resource 206) may be disposed within a controller and/or computing device. In this example, the executable instructions 232, 234, 236, 238, 240 can be "installed" on the device. In some examples, the non-transitory machine readable medium (e.g., a memory resource) can be a portable, external or remote storage medium, for example, that allows a computing system to download the instructions 232, 234, 236, 238, 240 from the portable/external/remote storage medium. In this situation, the executable instructions may be part of an "installation package". As described herein, the non-transitory machine readable medium (e.g., a memory resource 206) can be encoded with executable instructions for performing calculations or computing processes.

The instructions 232, when executed by a processor resource such as the processor resource 204, can include instructions to receive an image captured from a first device. In some examples, the image captured from the first device can be a video image captured by an imaging device (e.g., video camera, etc.) associated with the first device. In some examples, the first device can be a computing device or teleconferencing device. In some examples, receiving the image captured from the first device can include intercepting the image captured by the first device when the first device transmits the image data to a teleconference application or teleconference portal. In this way, the image data can be altered and/or provided with an image data bar as described herein.

The instructions 234, when executed by a processor resource such as the processor resource 204, can include instructions to determine a profile of the first device and corresponding information associated with the first device based on the profile. In some examples, the profile of the first device can include a user profile associated with the first device. In some examples, the profile of the first device can be a selectable profile from a plurality of profiles for a teleconference application or teleconference portal. In some examples, the plurality of profiles can include different categories of information and/or different quantities of personal information associated with the user and/or first device.

In some examples, each of the plurality of profiles can include a particular quantity of personal information to the user, a particular quantity of information associated with the physical location of the first device, and/or a particular quantity of selectable or downloadable information. In this way, a user can select one of the plurality of profiles to display a corresponding data bar that includes information associated with the categories of the selected profile. In some examples, a first profile can be selected for personal teleconferences, a second profile can be selected for a professional teleconference, and a third profile can be selected for first meeting between users of the teleconference. In this way, the profile can be selected based on the type of teleconference and/or the plurality of users that are attending the teleconference.

The instructions 236, when executed by a processor resource such as the processor resource 204, can include instructions to generate a data bar for the image utilizing the information associated with the first device. The data bar can include a plurality of portions or segments that can include corresponding information or corresponding categories. For example, the data bar can include a plurality of portions that can be assigned a particular category. In this example, the information that is associated with the selected profile can be positioned within the particular portion of the data bar based on the particular category. As described herein, the particular categories of the plurality of portions can be based on the selected profile and/or based on a selected type of teleconference. In some examples, the information and the selectable link can be organized within the data bar based on the selected profile. For example, the selectable link can be in a first portion while the information can be in a second portion for a first profile while the selectable link can be in the second portion while the information is in the first portion for a second profile. In some examples, the profile can disable the data bar from being displayed.

In some examples, the generated data bar can include the plurality of portions or segments with the corresponding categories where the data or information displayed within the plurality of portions can be dynamically updated. For example, the data bar can include categories assigned to the plurality of portions in contrast to assigning a particular set of data to the plurality of portions. In this way, the data that is displayed within the plurality of portions can be updated based on the category assigned to the plurality of portions. In this way, a portion of the data that is displayed within the data bar can remain constant throughout a teleconference while other data displayed within the data bar can be altered during the teleconference. In one example, a category can be current events. In this example, the data bar can extract information from a database to display the information associated with the category. In this way, the profile of a device can include a plurality of selectable categories for information to be extracted from databases.

In some examples, the information can be updated when the information associated with the category changes. For example, one of the plurality of categories can include a physical location of the first device. In this example, the physical location category can be update when the physical or geographical location of the first device changes. In some examples, the geographical location of the first device can be changed during the teleconference and the physical location category can be updated during the teleconference. In some examples, one of the plurality of categories can be a social media category, which can be updated with a news feed of the user of the first device. In this way, the social media category can be updated a plurality of times during the teleconference.

The instructions 238, when executed by a processor resource such as the processor resource 204, can include instructions to overlay the data bar on the image. In some examples, the data bar can be positioned over a portion of the image such that the data bar can cover a portion of the image. In some examples, the data bar can be moveable within the area of the displayed image of a user or captured image from the first device. In these examples, the data bar can be resized or altered to include a greater number of categories or a fewer number of categories. For example, a first quantity of categories can be displayed when the data bar is a first size and a second quantity of categories can be displayed when the data bar is a second size. In this way, the image size, shape, and/or aspect ratio may not be changed to accommodate the data bar. This can prevent distortion to the image or video data from the first device.

The instructions 240, when executed by a processor resource such as the processor resource 204, can include instructions to provide the image with the data bar to a second device. As described herein, the first device can be connecting to a teleconference application or teleconference portal. In these examples, the second device can be connecting to the same teleconference application to conduct a teleconference session with the first device. In some examples, the second device can include a display device that can display images to a second user associated with the second device. In these examples, the display device of the second device can display the image received by the from the first device with the generated data bar.

In some examples, the second device can be utilized to select portions or segments of the data bar to receive additional information related to a selected category. For example, a category of the data bar can include selectable documents that can be selected by the second device and downloaded to the second device. In other examples, the second device can request data from the first device. In these examples, the first device can provide the requested data within a portion of the data bar such that the second device can download the requested data. In this way, documents, images, and/or other data files can be more easily transferred during the teleconference session between the first device and the second device.

Figure 3:
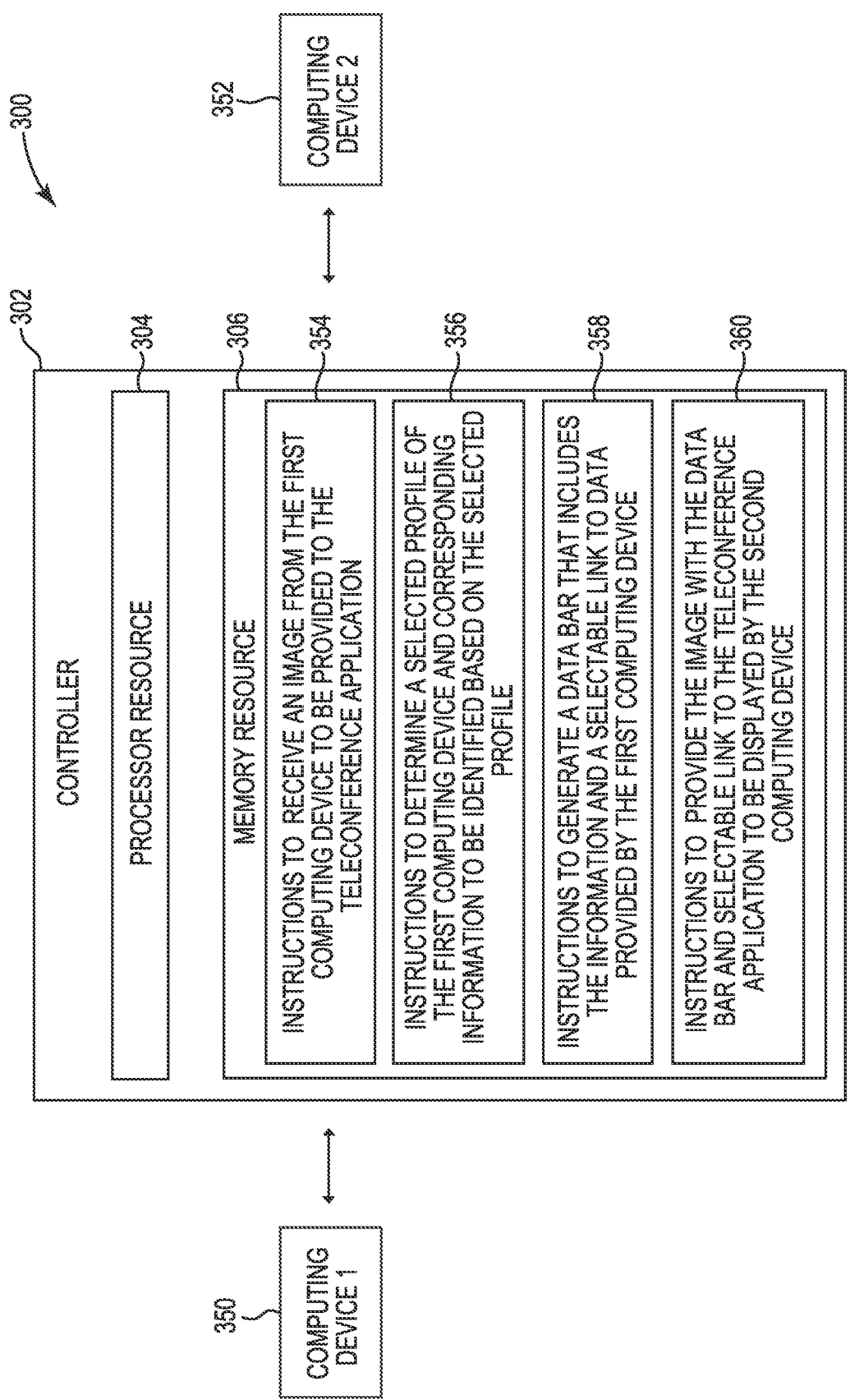
FIG. 3 illustrates an example of a system that includes a controller for providing image data bars.

FIG. 3 illustrates an example of a system 300 that includes a controller 302 for providing image data bars. In some examples, the controller 302 can be a computing device that includes a processor resource 304 communicatively coupled to a memory resource 306. As described herein, the memory resource 306 can include or store instructions 354, 356, 358, 360 that can be executed by the processor resource 304 to perform particular functions.

In some examples, the controller 302 can be associated with a teleconference application and/or teleconference portal. In some examples, the controller 302 can intercept image data to be provided to the teleconference application such that a data bar can be overlaid on the image data. For example, the computing device 350 can capture image data that can be provided to the controller 302. In this example, the controller 302 can generate a data bar based on information associated with the computing device and overlay the data bar on the image data such that the image data and data bar are visible on a display device of the computing device 352. In a similar way, the computing device 352 can send image data to the controller 302 and the controller 302 can generate a data bar based on information associated with the computing device 352. The data bar can be overlaid on the image data such that the image data and data bar can be viewable by a display device associated with the computing device 350.

In some examples, the controller 302 can include instructions 354 that can be executed by a processor resource 304 to receive an image from the first computing device 350 to be provided to the teleconference application. As described herein, the controller 302 can intercept image data captured by the first computing device 350 before the image data reaches a teleconference application or teleconference portal. In this way, the controller 302 can alter the image data and/or overlay a data bar over a portion of the image.

In some examples, the controller 302 can include instructions 356 that can be executed by a processor resource 304 to determine a selected profile of the first computing device and corresponding information to be identified based on the selected profile. In some examples, the selected profile can be based on a type of teleconference between the first computing device 350 and the second computing device 352. In this way, the information provided within the data bar can be customized for a particular teleconference and/or user of the second computing device 352. As described herein, the selected profile can be selected from a plurality of user profiles associated with a user of the first computing device 350.

In some examples, the profile can include a plurality of categories or subjects that can be utilized to extract data that can be provided within the data bar. In some examples, the data can be provided by the first computing device 350 and/or extracted from a remote database. For example, the first computing device 350 can provide documents that can be downloaded by the second computing device 352 through a selectable link to the documents (e.g., data, etc.). In this example, a category can be related to a geographical location. In these examples, the information can be extracted from a public database. In a specific example, the category can be "weather" and the weather information can be extracted from a public database.

In some examples, the controller 302 can include instructions 358 that can be executed by a processor resource 304 to generate a data bar that includes the information and a selectable link to data provided by the first computing device 350. In some examples, the data bar can be overlaid on the image data such that the information and the selectable link are displayed within an image portion generated by the first computing device 350. In some examples, the information can be updated periodically such that the information is updated dynamically during the teleconference session between the first computing device 350 and the second computing device 352. In some examples, the selectable link can allow the second user of the second computing device 352 to be provided with additional information associated with a particular category. For example, the selectable link can direct the second computing device 352 to a particular website or to a particular database. In some examples, the selectable link can direct the second computing device 352 to download a particular document or set of data.

In some examples, the controller 302 can include instructions 360 that can be executed by a processor resource 304 to provide the image with the data bar and selectable link to the teleconference application to be displayed by the second computing device 352. As described herein, the second computing device 352 can include a display device that can display the image and the data bar. In some examples, the data bar can be displayed along an edge of the image portion associated with the user of the first computing device 350. The information provided within the data bar can be specific to the user profile associated with the first computing device 350. In this way, the second user of the second computing device 352 can identify user information of the first user of the first computing device 350 and/or receive data through selections within the data bar.

Figure 4:
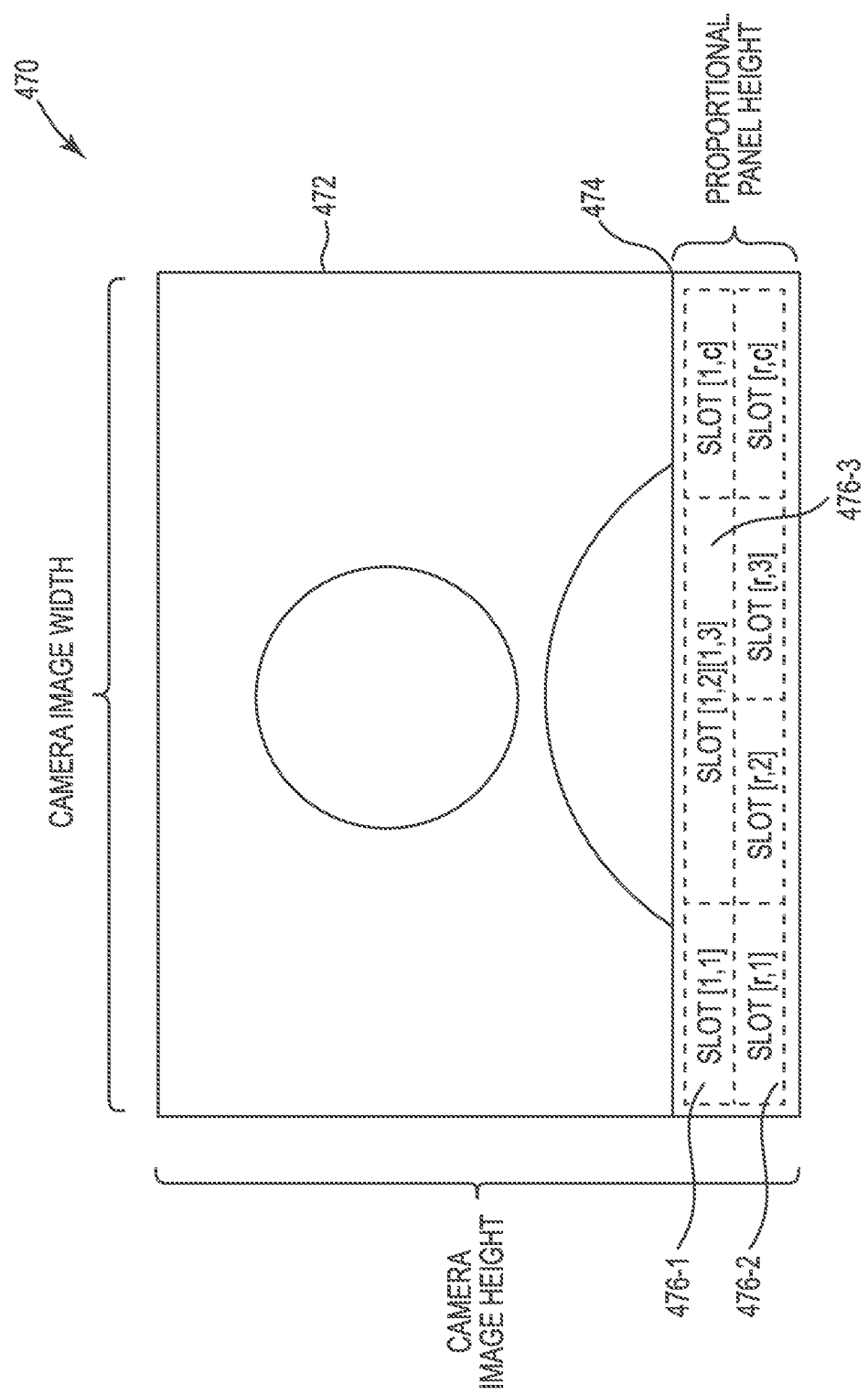
FIG. 4 illustrates an example of a display device for providing image data bars.

FIG. 4 illustrates an example of a display device 470 for providing image data bars. The display device 470 can include a monitor, television, or other type of display device that can display images (e.g., still images, video, etc.). In some examples, the image displayed on the display device 470 can include an image portion 472 and the data bar 474. The image portion 472 can include received images from a imaging device associated with a remote computing device. In some examples, the display device 470 can be utilized with a computing device that is in a teleconference with a remote computing device.

In some examples, the data bar 474 can be overlaid on the image portion 472 such that the size or aspect ratio of the image portion 472 is not altered. In this way, the image portion 472 of a remote user may not be distorted. As described herein, the data bar 474 can include information associated with a remote user displayed within the image portion 472.

In some examples, the data bar 474 can include a plurality of segments 476-1, 476-2, 476-3. As described herein, the plurality of segments 476-1, 476-2, 476-3 can each include corresponding information and/or selectable inputs based on a user profile selected by the remote user displayed within the image portion 472. In some examples, the quantity of the plurality of segments 476-1, 476-2, 476-3 and/or the information within the plurality of segments 476-1, 476-2, 476-3 can be based on the selected user profile. In some examples, the information within the plurality of segments 476-1, 476-2, 476-3 can be information associated with the user, geographical location of the device associated with the user, among other information that can be extracted from the device of the user and/or an accessible database.

In some examples, the plurality of segments 476-1, 476-2, 476-3 can be positioned within the designated area of the data bar 474. For example, the size or shape of the data bar 474 can be altered and the plurality of segments 476-1, 476-2, 476-3 can be maintained within the size of the data bar 474. In some examples, expanding the data bar 474 to a larger size can increase the size and/or quantity of the plurality of segments 476-1, 476-2, 476-3. For example, increasing the size of the data bar 474 can decrease a visible portion of the image portion 472 and increase a quantity of the plurality of segments 476-1, 476-2, 476-3. In some examples, each of the plurality of segments 476-1, 476-2, 476-3 can be different sizes based on the information displayed within the plurality of segments 476-1, 476-2, 476-3. For example, a geographic location within a first segment 476-1 can be relatively smaller than a social media post within a third segment 476-3. In this way, the size of the third segment 476-3 can be relatively larger than the first segment 476-3 to accommodate the quantity of information.

In other examples, the data bar 474 can include a first row of segments (e.g., first segment 476-1, third segment 476-3) and a second row of segments (e.g., second segment 476-2) In some examples, the quantity of rows of segments can be based on the user profile that is selected and/or a size of the data bar 474 that can be adjusted by a user of the display device 470. For example, the data bar 474 can be expanded to reveal an additional row of segments or decreased to remove one or more of the rows of segments. In this way, the user of the display device 470 can view a greater quantity of information associated with particular users and/or view less information associated with other users associated with a particular teleconference.

In some examples, the data bar 474 can be constrained or positioned within the boundaries of the image portion 472. For example, the width of the data bar 474 can be positioned within the width of the image portion 472. In this way, the information within the data bar 474 can be more easily associated with a particular user. For example, the data bar 474 for one user may not be extended into an image portion of a different user. In a similar way, the data bar 474 may not be able to extended beyond a height of the image portion 472 of a particular user such that the data bar 474 extends into the image portion of a different user.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations.

What is claimed is:

1. A device, comprising: a processor resource; and a non-transitory memory resource storing machine-readable instructions stored thereon that, when executed, cause the processor resource to:
    determine a performance and health data associated with a first computing device capturing an image;
    intercept image data, of the image captured at the first computing device, to modify the image data;
    determine a plurality of plurality of segments for a data bar, wherein the plurality of segments include a corresponding plurality of categories, wherein at least one category includes information associated with the performance and health data associated with the first computing device;
    determine a profile of the first computing device and corresponding information associated with the first computing device based on the profile and the plurality of categories and a selectable link within a segment of the plurality of segments to data provided by the first computing device;
    generate the data bar for the image utilizing the information positioned within the plurality of segments based on the corresponding plurality of categories;
    modify the image data by overlaying the data bar on the image data; and
    provide the image with the data bar and the selectable link to a teleconference application to be displayed by a second computing device, wherein the data is downloaded to the second computing device upon selection of the selectable link.

2. The device of claim 1, wherein the image data with the overlayed data bar provided by the processor resource is sent to a display of second computing device.

3. The device of claim 1, wherein the plurality of categories further include information associated with the first computing device that is based on a determined geographic location of the first computing device and a user profile associated with the first computing device.

4. The device of claim 1, wherein the plurality of categories further include information associated with the first computing device that is based on a profile of the first computing device that includes corresponding information associated with the first computing device.

5. The device of claim 1, wherein the processor resource is to alter a size of the data bar by altering the plurality of categories displayed by the data bar based on a size of the image data.

6. The device of claim 1, wherein the processor resource is to alter determined information at a plurality of time intervals.

7. The device of claim 1, wherein the data bar includes selectable inputs to download data associated with the information.

8. A non-transitory memory resource storing machine-readable instructions stored thereon that, when executed, cause a processor resource to:
    determine a performance and health data associated with a first device capturing an image;
    receive the image captured from the first device;
    intercept image data, of the image captured at the first device, to modify the image data;
    determine a plurality of plurality of segments for a data bar, wherein the plurality of segments include a corresponding plurality of categories, wherein at least one category includes information associated with the performance and health data associated with the first device;

determine a profile of the first device and corresponding information associated with the first device based on the profile and the plurality of categories and a selectable link within a segment of the plurality of segments to data provided by the first device;

generate the data bar for the image utilizing the information positioned within the plurality of segments based on the corresponding plurality of categories;

modify the image data by overlaying the data bar on the image data; and provide the image with the data bar and the selectable link to the teleconference application to be displayed by a second device, wherein the data is downloaded to the second device upon selection of the selectable link.

9. The memory resource of claim 8, wherein the profile of the first device includes a plurality of determined categories of information extracted from a database.

10. The memory resource of claim 8, wherein the data bar includes selectable links positioned within a segment of the plurality of segments displayed to the second device.

11. The memory resource of claim 10, wherein the selectable links allow the second device to download data provided by the first device.

12. A system, comprising:
a first computing device; a second computing device; a teleconference application communicatively coupling the first computing device and the second computing device; and
a controller coupled associated with the teleconference application, the controller comprising instructions to:
determine a performance and health data associated with the first computing device;
receive an image from the first computing device to be provided to the second computing device;
intercept image data, of the image captured at the first computing device, to modify the image data;
determine a plurality of plurality of segments for a data bar, wherein the plurality of segments include a corresponding plurality of categories, wherein at least one category includes information associated with the performance and health data associated with the computing device;
determine a profile of the first computing device and corresponding information to be identified based on the profile and the plurality of categories;
generate the data bar that includes the information within the plurality of segments based on the corresponding plurality of categories and a selectable link within a segment of the plurality of segments to data provided by the first computing device;
modify the image data by overlaying the data bar on the image data; and
provide the image with the data bar and the selectable link to the teleconference application to be displayed by the second computing device, wherein the data is downloaded to the second computing device upon selection of the selectable link.

13. The system of claim 12, wherein an aspect ratio of the image remains the same when the data bar is overlaid on to the image.

14. The system of claim 12, wherein the information and the selectable link is organized within the data bar based on the profile.

15. The system of claim 12, wherein information to be identified is based on a physical location of the first device.

* * * * *